No. 893,232. PATENTED JULY 14, 1908.
J. F. FORTH.
OPTICAL TESTING INSTRUMENT.
APPLICATION FILED FEB. 19, 1907.
2 SHEETS—SHEET 2.
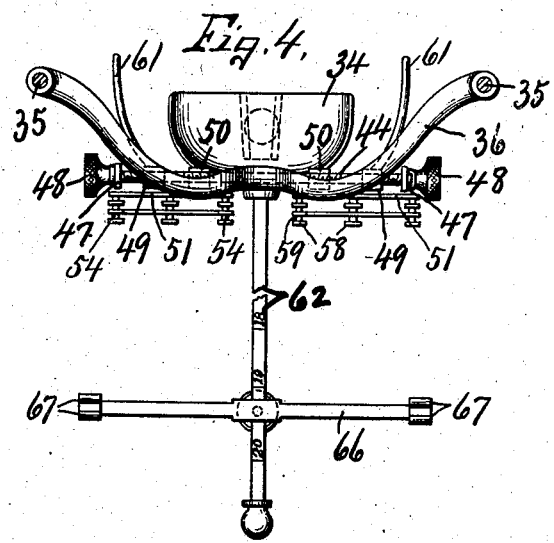
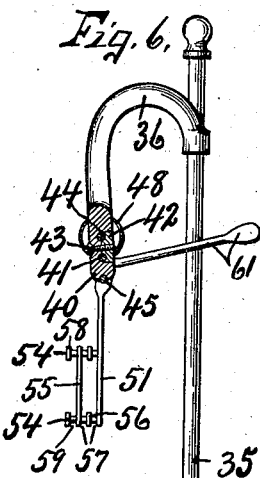
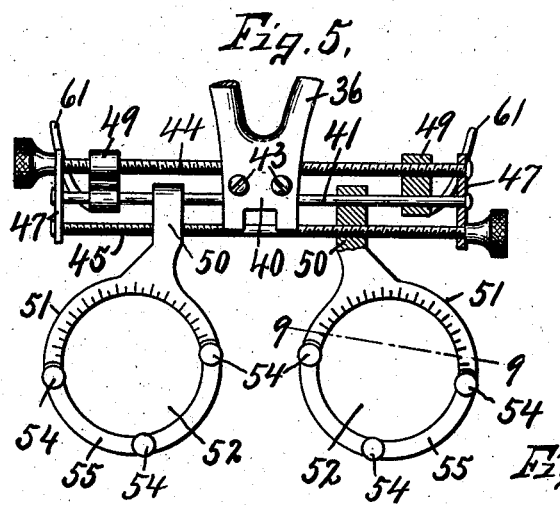
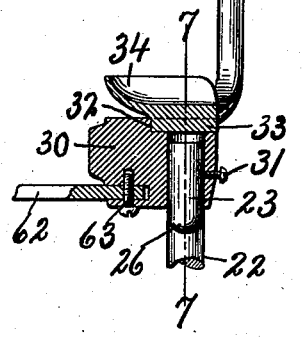
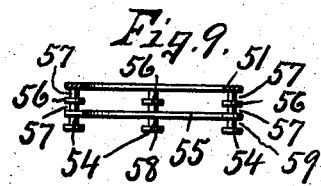

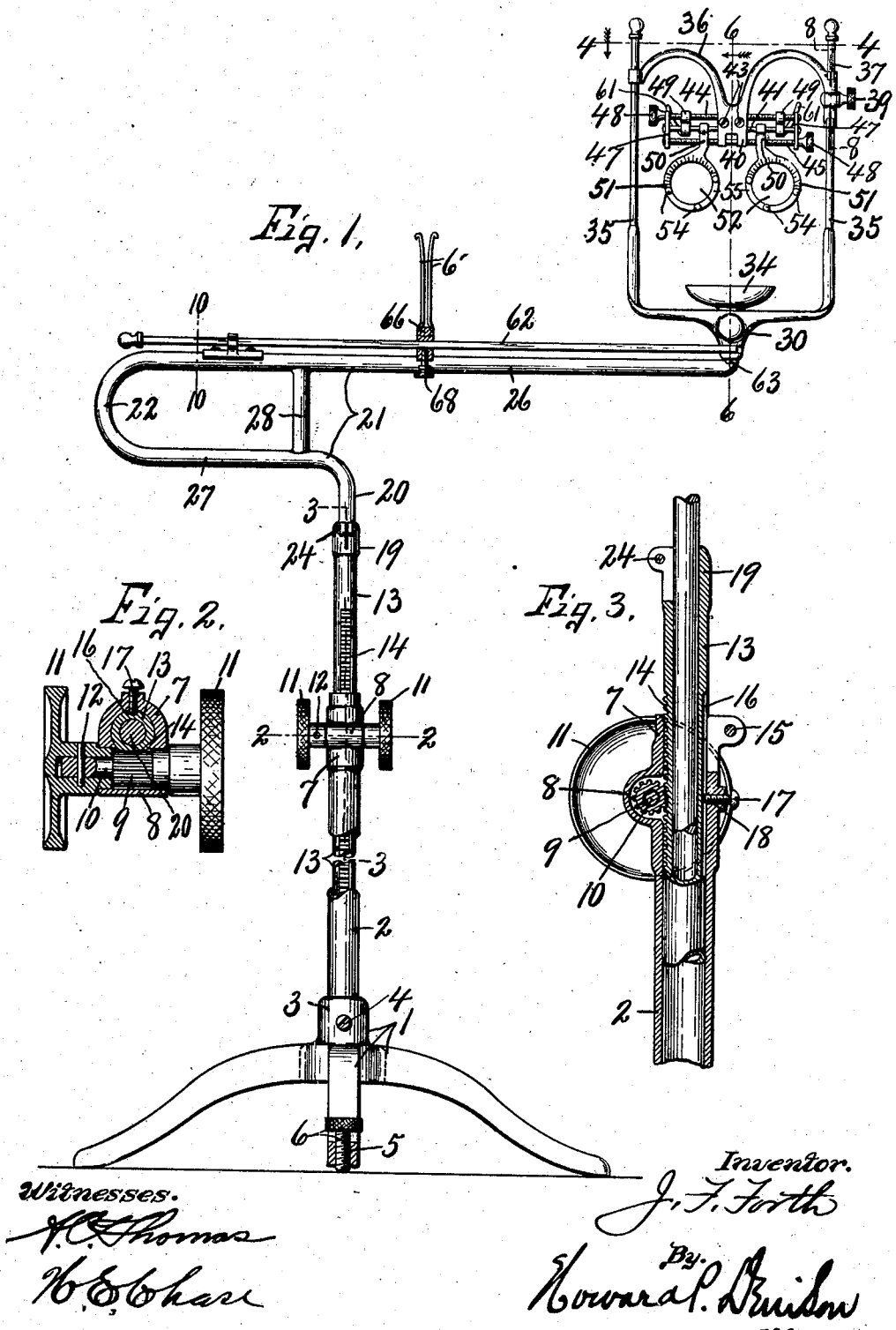

UNITED STATES PATENT OFFICE.

JOHN F. FORTH, OF SYRACUSE, NEW YORK.

OPTICAL TESTING INSTRUMENT.

No. 893,232.  Specification of Letters Patent.  Patented July 14, 1908.

Application filed February 19, 1907. Serial No. 358,332.

*To all whom it may concern:*

Be it known that I, JOHN F. FORTH, of Syracuse, in the county of Onondaga, in the State of New York, have invented new and useful Improvements in Optical Testing Instruments; of which the following, taken in connection with the accompanying drawings, is a full, clear, and exact description.

This invention relates to certain improvements in optical testing instruments of the class set forth in the patent to J. F. Forth and E. J. Langley No. 874,179, issued December 17, 1907.

The object of my present invention is to increase the general efficiency and utility of the device set forth in the application previously referred to, by, first, providing mechanical means for raising and lowering the vertically adjustable section of the standard; second, by providing adjusting means on one of the supporting legs whereby the standard may be brought to a vertical position; third, by providing an adjustable card support movable toward and from the lens holders for testing the eyes at different ranges; fourth, by bracing the horizontal arm upon which the chin rest is mounted against undue resiliency or vertical vibration; fifth, by sustaining the chin piece in place by a wedging friction fit with its support; sixth, by providing temple rests for holding the head in proper position with relation to the lens holders; seventh, by supporting the lens holders and temple rests upon the same guide bar and providing separate means for their adjustment along said bar; eighth, by providing mechanical means for the vertical adjustment of the lens holders and temple rests toward and from the chin piece, and, ninth, by providing the lens holders with a plurality of guides each having three points of support for the lenses.

Other objects and uses will appear in the following description:

In the drawings,—Figure 1 is a side elevation partly broken away and partly in section of an optic testing instrument embodying the various features of my invention. Figs. 2 and 3 are enlarged horizontal and vertical sectional views taken respectively on lines 2—2 and 3—3, Fig. 1. Fig. 4 is an enlarged horizontal sectional view taken on line 4—4, Fig. 1. Fig. 5 is an enlarged front elevation partly in section of the lens holders and their adjusting mechanisms showing the guide rod upon which they are mounted and a portion of the yoke carrying the guide rod. Figs. 6, 7 and 8 are sectional views taken respectively on lines 6—6, Fig. 1; 7—7, Fig. 6 and 8—8, Fig. 1; Figs. 6 and 8 being somewhat enlarged. Fig. 9 is a detail sectional view taken on line 9—9, Fig. 5 showing the plurality of guides of the lens holder. Fig. 10 is a detail sectional view taken on line 10—10, Fig. 1.

In carrying out the objects stated, I provide a three legged base —1— with a vertical tubular standard —2— having its lower end removably secured in a hub —3— on the base —1— and held in position by a set screw —4— so that the standard may be separated from the base in shipping or storing. One of the legs of the base —1— is provided near its floor engaging end with a threaded socket —5— in which is adjustable a thumb screw —6— whereby the base may be adjusted on uneven floors or supports to bring the standard —2— into a vertical position. The standard —2— extends some distance above the base —1— and is provided at its upper end with a split hub —7— having a laterally projecting tubular bearing —8— at one side of its axis in which is journaled a pinion —9—. This pinion —9— is mounted upon a spindle —10— which projects some distance beyond the opposite ends of the bearing —8— and is provided with opposite hand wheels —11—, one of which, at least, is removably secured to the spindle —10— by suitable fastening means as a pin or key —12— so that the pinion —9— may be inserted into or removed from the bearing —8— which is slightly larger in diameter than the pinion and receives adjacent ends of the hubs of the hand wheels —11—.

A vertically adjustable standard section —13— is movable in and telescopes with the fixed standard —2— across the plane of the pinion —9— and is provided on its face adjacent to the pinion with a toothed rack —14— engaged with said pinion so that by rotating the pinion the standard section —13— may be adjusted vertically through the split hub —7— which may be tightentd by a clamping screw —15— to lock the adjustable standard section —13— in its adjusted position. The side of the adjustable standard section —13— opposite to that upon which the toothed rack —14— is formed is provided with a lengthwise groove —16— for receiving one end of a screw —17— which is passed through a threaded aperture —18— in the hub —7— to prevent rotation of the standard section —13— in the fixed section —2— thereby keeping the toothed rack —14— in mesh with the pinion —9—. This vertically adjustable section —13— is also tubular and is provided at its upper end with a split hub —19— through which is inserted the lower upright end —20— of a horizontal arm —21— having a return bend —22— at one side of the upright portion —20—, the upper portion of the return bend being extended some distance to the opposite side of the upright —20— and terminates in a comparatively short vertical stem or stud —23—. This entire super-structure consisting of the upright portion —20— and return bend arm —21— is adjustable vertically and rotatable in the tubular section —13— and is clamped in its adjusted position through the medium of the split hub —19— and a clamping bolt —24— for tightening the opposite sides of the split hub —19— upon the upright portion —20— of the arm —21—.

The object of extending the return bend —22— laterally to one side of the axis of rotation of the arm —21— is to counterbalance the weight or load upon the free end of the upper horizontal arm which carries the lens holder and chin piece so as to prevent over-turning of the apparatus and in order to prevent excessive vertical vibration or movement of the free end of the upper horizontal arm as —26— its intermediate portion is supported upon the lower horizontal arm as —27— by an upright brace —28— as best seen in Fig. 1.

Mounted upon the upright terminal end —23— of the arm —26— is a hub —30— which is secured to said upright —23— by a set screw —31— and is provided in its upper face with a taper dove-tail groove —32— in which is frictionally fitted and held a dove-tail rib —33— on the lower side of a concavo-convex chin rest —34—. This hub —30— is provided with a pair of upwardly projecting arms —35— disposed equi-distant at opposite sides of the vertical axis of the stud —23— for receiving and guiding a vertically movable yoke —36—. One of the arms —35— is provided with a toothed rack —37— which is engaged by a pinion —38—, Fig. 8, the latter being journaled in the adjacent end of the yoke —36— and is provided with a suitable hand piece —39— whereby it may be rotated for adjusting the yoke —36— vertically, the ends of said yoke being provided with tubular hubs fitted and sliding upon the arms —35—. This yoke preferably consists of a double arch frame having a central depending portion —40— midway between the arms —35— for supporting a horizontal guide rod —41— as best seen in Fig. 5, said guide rod being removable and is held in place by a clamping plate —42— and suitable fastening means as screws —43— for clamping said plate and interposed guide rod in place upon the yoke —36— which also serve to retain in place a pair of adjusting screws —44— and —45— which are disposed respectively above and beneath and parallel with the guide rod —41—. This guide rod extends laterally equi-distances at opposite sides of the depending central portion —40— of the yoke —36— but is wholly between the arms —35—.

Secured to opposite ends of this bar are upright plates —47— having apertures above and beneath the rod —41— forming journal bearings for the screws —44— and —45— which are free to turn in the central depending arm —40— of the yoke —36— and are provided with suitable hand pieces —48— by which they may be turned. The opposite ends of the screw —44— are provided with threads of opposite pitch which are engaged by nuts —49— arranged equi-distant from the center of the pendent arm —40— and are guided upon the guide rod —41— which also serves to prevent rotation of the nuts —49—. In like manner the opposite ends of the screw —45— are provided with threads of opposite pitch and are engaged by nuts —50,— which are also disposed equi-distant from the center of the pendent arm —40— and are guided upon the central rod —41—, the nuts —50— being located at the inner ends of their companion nuts —49—. Secured to these nuts —50— are a pair of pendent circular frames —51— which are disposed equi-distant at opposite sides of the vertical center of the pendent arm —40— and are provided with central sight openings —52—. Secured to each circular frame —51— is a series of, in this instance, three laterally projecting studs —54— which support a semi-circular segment —55— spaced apart some distance from the ring —51—. Each stud is provided with an annular shoulder —56— midway between the segment —55— and circular ring —51— forming intervening grooves —57— for receiving and retaining a plurality of at least two lenses parallel with each other. These studs are projected some distance beyond the segment —55— and are provided with additional annular flanges —58—, forming additional grooves —59— for the reception of additional lenses upon the same holder during the operation of testing the eyes.

A horizontal swinging card-support —62— is pivoted at one end —63— to the hub —30— and is adapted to be swung at substantially right angles to the plane of the lens holders —51— as shown in Fig. 4 when adjusted to testing position or may be moved substantially parallel with the arms —26— with its free end resting in a suitable seat —65— on said arm. A card holder —66— having spring fingers —67— is mounted upon and slidable along the arm —62— and may be clamped in its adjusted position by a set screw —68— as best seen in Fig. 1.

Secured to the nuts —49— are forwardly projecting arms —61— constituting temple rests to engage the temples of the patient thereby holding the head of the patient in proper position so that the lens holders may be properly adjusted to the eyes.

In operation, the apparatus is first leveled up on the floor by means of the adjusting screw —6— in one of the legs of the base —1— after which the standard section —13— and super-structure carried thereby is adjusted vertically to conform to the sitting or standing posture of the patient whereupon the said vertically adjustable section —13— is clamped in its adjusted position by the split hub —7— and clamping bolt —15—. The frame —21— may then be turned in the bearing —19— to bring the chin piece —34— in proper position to support the chin of the patient whereupon the lens holders —51— may be adjusted vertically by means of the rack —37— and pinion —38— and may also be adjusted laterally by means of the screw —45— to bring the centers of the circular frames —51— into exact coincidence with the pupils of the eyes while the chin of the patient is resting on the chin rest —34—.

Prior to the adjustment of the lens holders the temple guards or rests —61— are adjusted by means of the screw —44— and nuts —49— so as to engage the temples of the patient and hold the head in proper relation to the lens holder with the chin resting on the rest —34—. When these adjustments are properly made, a card bearing suitable reading matter is placed between the spring fingers —67— of the card holder —66— and the arm —62— is then swing horizontally to a position at right angles to the plane of the lens holders whereupon the card holder is adjusted lengthwise of the rod —62— to determine the range of vision of the patient, said rod —62— and also the lens holders —51— being graduated to indicate the quality of the lens required.

What I claim is:

1. In an optical testing instrument of the class described, a three legged base having an upright tubular standard rising centrally from the base, an upright section telescoping with and adjustable in the tubular standard having a lateral offset at one side of its axis, a lens supporting frame mounted upon the offset, and an adjusting screw in one of the legs at one side of the axis of the standard for leveling up the base to bring the standard in a vertical position.

2. In an optical testing instrument, two upright guide bars spaced some distance apart, a vertically adjustable yoke guided on said bars, a toothed rack on one of the bars, a pinion journaled on the yoke and engaging the teeth of said yoke and means on the yoke for rotating said pinion.

3. In an instrument of the class described, a chin rest and vertically adjustable support therefor in combination with lens holders above the chin rest said chin rest having horizontal sliding interlocking connection with its support.

4. In an instrument of the class described, a chin rest and support therefor in combination with a pair of lens holders, and a support therefor movable toward and from the chin rest said chin rest having horizontal sliding interlocking connection with its support, and means for adjusting said support.

5. In an instrument of the class described, a pair of lens holders, each consisting of a circular frame, and a semi-circular segment disposed in a plane parallel with but some distance from the circular frame, and a plurality of studs uniting the segment to the frame and forming bearings for the lens and additional lens supporting studs projecting from the segment.

6. In an instrument of the class described, in combination with a pair of lens holders, of a horizontally swinging arm adapted to be brought to a position at substantially right angles to the plane of the lens holder, and a card holder adjustable along the arm.

7. In an instrument of the class described, a U-shape frame and vertically adjustable support therefor, a yoke slidable vertically on a frame, means for adjusting said yoke vertically, a horizontal guide rod mounted on the yoke, temple guards slidable lengthwise of the rod, means for adjusting the temple guards toward and from each other, a pair of lens holders also movable along and upon the rod, separate means for adjusting the lens holders toward and from each other, a graduated arm extending at substantially right angles to the plane of and below the lens holders, and a card support movable along said arm.

8. In an optical testing instrument, a supporting frame having upright arms, a yoke connecting and slidable upon said arms, a guide rod clamped to the yoke, temple guards slidable on the rod, lens holders also slidable on said rod, and separate devices for adjusting the temple guards and lens holders along said guide rod.

In witness whereof I have hereunto set my hand this 12th day of February 1907.

JOHN F. FORTH.

Witnesses:
H. E. CHASE,
MILDRED M. NOTT.